(12) United States Patent
Belew et al.

(10) Patent No.: US 6,964,098 B1
(45) Date of Patent: Nov. 15, 2005

(54) MID-SHEATH CABLE PREPARATION TOOL

(75) Inventors: Michael Shane Belew, Columbus, OH (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 13 days.

(21) Appl. No.: 10/743,622

(22) Filed: Dec. 22, 2003

(51) Int. Cl.[7] ............................................... H02F 1/12
(52) U.S. Cl. ........................................ 30/90.4; 30/90.1
(58) Field of Search ............................. 30/90.1, 90.4, 30/90.6, 90.7

(56) References Cited

U.S. PATENT DOCUMENTS

| | | | | |
|---|---|---|---|---|
| 3,378,924 A | * | 4/1968 | Porter | 30/91.2 |
| 4,078,303 A | * | 3/1978 | Wiener | 30/90.1 |
| 4,149,312 A | * | 4/1979 | Arnot | 30/98 |
| 4,449,298 A | * | 5/1984 | Putz | 30/90.1 |
| 4,517,741 A | * | 5/1985 | Castelluzzo | 30/162 |
| 4,656,893 A | * | 4/1987 | Hudson | 81/9.51 |
| 4,958,433 A | * | 9/1990 | Persson | 30/91.2 |
| 5,093,992 A | * | 3/1992 | Temple et al. | 30/90.8 |
| 5,140,751 A | * | 8/1992 | Faust | 30/91.1 |
| 5,306,378 A | * | 4/1994 | Takimoto et al. | 156/344 |
| 5,357,830 A | * | 10/1994 | Mori et al. | 83/13 |
| 5,377,410 A | * | 1/1995 | Welch | 30/90.1 |
| 5,533,264 A | * | 7/1996 | Wheary | 30/90.1 |
| 6,044,744 A | | 4/2000 | Eslambolchi et al. | |
| 6,581,291 B1 | | 6/2003 | Tarpill et al. | |
| 6,622,386 B2 | | 9/2003 | Miller et al. | |

* cited by examiner

Primary Examiner—Hwei-Siu Payer

(57) ABSTRACT

The present invention is an apparatus and method for removing a portion of a cable sheath. First and second opposing blades are adjustable to a cutting depth using adjustment screws and continuity testers that signal contact between each blade and a metallic sub-sheath. The blades are inclined at an angle to a transverse plane of the cable, and are contoured to conform to the sheath radius. A guide including neoprene rollers keeps the cutting assembly aligned on the cable. The cutting assembly is drawn along the cable, removing the sheath.

19 Claims, 4 Drawing Sheets

MID-SHEATH CABLE PREPARATION TOOL

FIELD OF THE INVENTION

The present invention relates generally to the repair of optical fiber cables having a polyethylene or other protective sheath. More particularly, the present invention is an apparatus and method for removing a portion of the poly sheath at a point on the cable remote from the ends.

BACKGROUND OF THE INVENTION

In the installation and maintenance of transmission cable such as fiber optic cable, the removal of poly sheathing frequently presents difficulties in safeguarding the delicate transmission fibers contained within the sheath. The problem is especially precarious during optical fiber cable work when there is working service on the fiber cable. In such situations, the cable sheath frequently must be removed at a location distant from the ends of the cable ("mid-sheath"), making the task even more difficult. The industry standard approach to that problem is presently for the OSP technician to use hand-held cutting knives to remove the polyethylene and steel membranes from around the fiber cable. In performing that task, the OSP technician could slip and cut the cable, in which case service would be lost during the process. A tool is needed that would allow the polyethylene and steel sheaths to be removed without the danger of damaging the fiber cable.

Small hand tools further present danger to the OSP technician, who is exposed to the sharp blades of the hand knives as they are forced through the sheath and along the cable. A device is needed that would safely remove the poly sheath.

Several specialized tools have been proposed for removing cable sheathing. U.S. Pat. No. 5,533,264 to Wheary, issued Jul. 9, 1996 and incorporated herein by reference in its entirety, describes an apparatus for removing metallic or non-metallic cable sheathing using a single sharpened wheel cutting element attached to a chain that is rolled around the cable to make a circular cut. The apparatus may include a continuity measurement circuit for measuring continuity between the cutting element and a shield layer of the cable.

U.S. Pat. No. 6,581,291 to Tarpill et al., issued Jun. 24, 2003 and incorporated herein by reference in its entirety, describes a cable stripping tool that longitudinally slits the cable sheath using a blade that is adjustable using an adjustment screw. The sheath must be removed after slitting using conventional methods.

U.S. Pat. No. 6,044,744 to Eslambolchi et al., issued Apr. 4, 2000 and incorporated herein by reference in its entirety, describes a fiber optic cable sheath removal tool that uses an electrically driven cutting wheel to make circumferential and longitudinal cuts in the cable sheath. Depth of cut is adjusted using an adjusting mechanism that displaces cable guides toward or away from the cutting wheel. The tool is used to make cuts in both directions before the sheath is removed.

Each of the above-described tools cuts the cable sheath but does not remove the sheath during the cutting step. The sheath must be subsequently removed using an additional step with the tool or with hand tools.

There is therefore presently a need for a method and apparatus for removing a section of fiber optic cable sheath at a mid-sheath location on a cable in a quick and efficient manner, without damaging the fibers within the cable and without endangering the OSP technician. To the inventors' knowledge, there is currently no such apparatus or method employed to satisfactorily accomplish that task.

SUMMARY OF THE INVENTION

The present invention addresses the needs described above by providing a an apparatus and a method for removing a sheath on an optical fiber cable. In one embodiment, an apparatus includes a body having a central hole, the body being split for positioning around the cable. First and second opposed cutting blades have cutting edges protruding from the body into the central hole. The cutting edges face the cable, and the blades are positioned at a cutting angle to a transverse plane of the cable. The apparatus also includes first and second adjusting screws that are rotatably mounted in the body for urging the first and second cutting blades toward said cable. First and second continuity test circuits are provided for testing electrical continuity between a metallic sub-sheath of the cable and corresponding ones of the first and second cutting blades. Finally, a cable stabilizer bushing is included for contacting and aligning the body. The bushing has a central hole for accepting the cable, and has a plurality of elastomeric rollers extending into the hole for rolling on the cable. The bushing is split for positioning around the cable.

The cutting edges of the cutting blades may be elliptical. The apparatus may further include a locking clasp for locking the body on the cable. The cable stabilizer bushing may further include first and second locking clasps for locking the bushing on the cable.

The apparatus may also comprise a jumper wire for connecting the continuity circuits to the metallic sub-sheath of the cable. The continuity circuits each may include a battery, an indicator light and a continuity lug for connecting a jumper wire. The indicator light may be a green LED.

The apparatus may include first and second blade retainers slideably mounted in the housing and contacting corresponding adjusting screws. Those blade retainers have blade stops for backing up the cutting blades. The first and second blade supports may further comprise magnets proximate the blades for retaining the blades during removal and insertion of the blades to the body.

In another embodiment of the invention, a method is provided for removing a sheath at a mid-sheath point on an optical fiber cable. The method includes the step of clamping a cutter body around the cable. A first adjustment screw is turned to advance a first cutting blade into the sheath until a first continuity circuit indicates that there is electrical continuity between the first cutting blade and a metallic sub-sheath of the cable. A second adjustment screw is then turned to advance a second cutting blade opposing the first cutting blade into the sheath until a second continuity circuit indicates that there is electrical continuity between the second cutting blade and the metallic sub-sheath. The cutter body is then advanced in a longitudinal direction along the cable, whereby the first and second cutting blades remove portions of the sheath.

The method may also include the steps of clamping a cable stabilization bushing around the cable, and maintaining alignment of the cutter body by contacting the body with the cable stabilization bushing.

In another aspect of the invention, the method may also include the steps of assembling the first and second cutting blades on magnetized blade supports, and inserting the blade supports into the housing.

Another embodiment of the invention is an apparatus for removing a sheath on a cable. The apparatus includes a body having a central hole, and a plurality of opposed cutting blades having cutting edges protruding from the body into the central hole. The cutting edges face the cable, with the blades being positioned at cutting angles to a transverse plane of the cable. The apparatus also includes a plurality of adjusting screws rotatably mounted in the body for urging corresponding ones of the cutting blades toward said cable. At least one continuity test circuit is included for testing electrical continuity between a metallic sub-sheath of the cable and the cutting blades.

The apparatus may include a cable stabilizer bushing for contacting and aligning the body. The bushing has a central hole for accepting the cable. The bushing may have a plurality of elastomeric rollers extending into the hole for rolling on the cable. The bushing may further be split for positioning around the cable.

A jumper wire may be included for connecting the at least one continuity circuit to the metallic sub-sheath of the cable. The continuity circuits may include a battery, an indicator light and a continuity lug for connecting a jumper wire.

The apparatus may include a locking clasp for locking the body on the cable. The cutting edges of the cutting blades may be elliptical.

DESCRIPTION OF THE INVENTION

Figure 1:
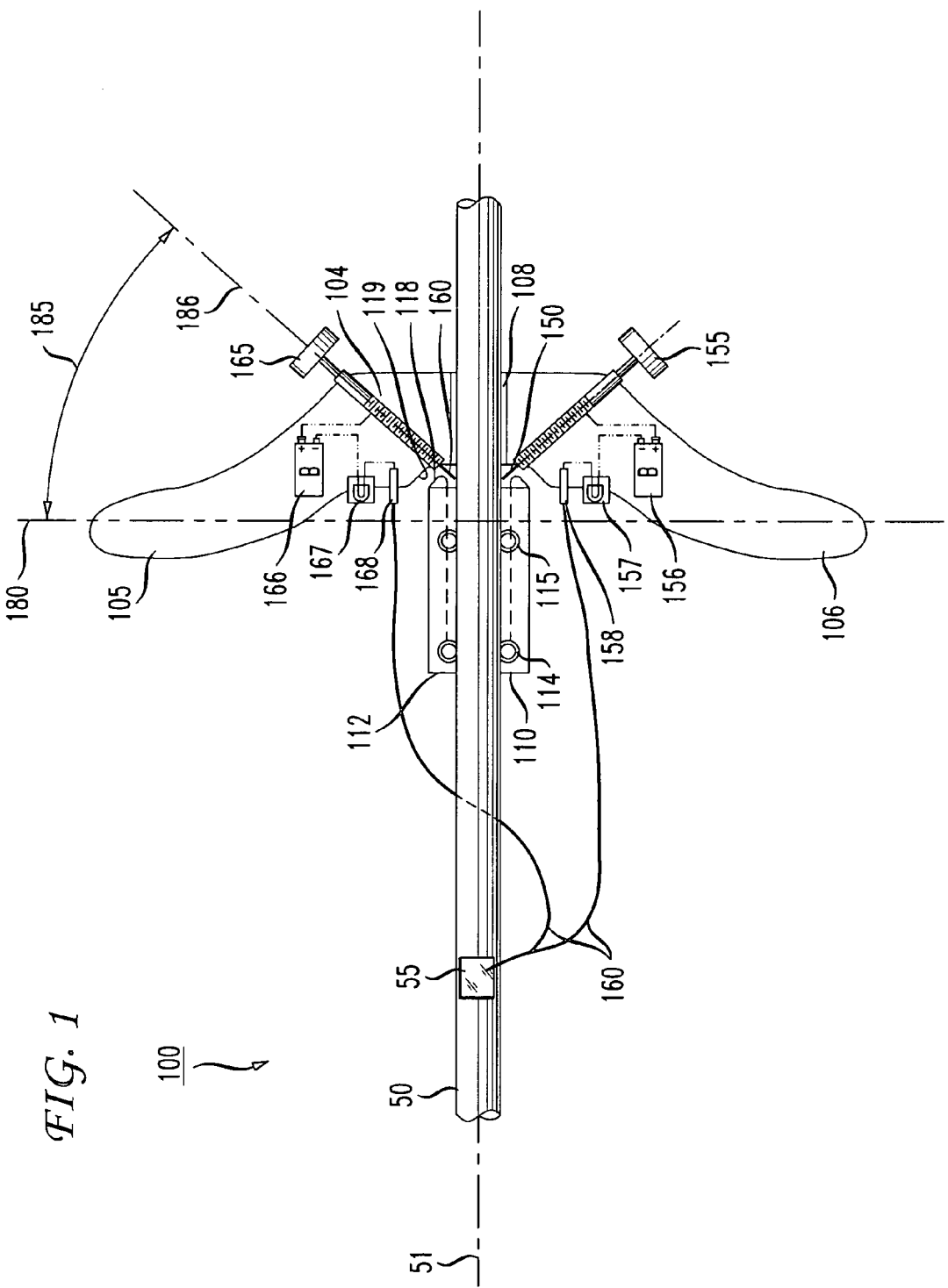
FIG. 1 is a side elevation view of an apparatus for removing a cable sheath according to one embodiment of the invention.

An apparatus 100 according to the present invention is shown in FIG. 1. The apparatus is for removing polyethylene sheath from a cable 50 in a region between the ends of the cable. The apparatus is generally in the form of a draw knife that can be locked around the fiber cable. The poly sheath is then peeled as the unit is pulled along the cable 50.

A dual handle assembly includes a cutter body 104 and two handles 105, 106 for grasping during the cutting stage of the sheath removal process. The cutter body 104 has a central bore 108 for receiving the cable 50 as described below. Disposed within the cutter body 104 are two blade adjustment/retention assemblies 155, 165 for holding the cutting blades 150, 160 in position for cutting and removing the sheath covering cable 50. The blades 150, 160 protrude into the central bore 108. While the apparatus of the invention will be described herein as comprising two blades and two adjustment/retention assemblies, the assembly may comprise three or more blades and still remain with the scope of the invention.

The blade adjustment/retention assemblies 155, 165 are mounted in threaded bores in the cutter body 104. The blades 150, 160 are retained and adjusted using the adjustment/ retention assemblies as described below. Those assemblies 155, 165 and the blades 150, 160 are positioned to form a cutting angle 185 between an axis 186 of the assemblies and a plane 180 that is transverse to a longitudinal axis 51 of the cable 50. In a preferred embodiment, the cutting angle is about 45 degrees.

The apparatus 100 also includes a cable stabilizer bushing 110 having a central bore 112 for surrounding the cable 50. Elastomeric guides 114, 115 such as rollers constructed of a neoprene composition are mounted in the bushing 110 for guiding the bushing on the cable. The guides 114, 115 are compressed between the cable 50 and the bushing 110 as the cable is inserted into the bushing, guiding and orienting the bushing on the cable without damaging the cable. In one embodiment, the guides are neoprene O-rings. In another embodiment, the guides are neoprene cylindrical members that roll on the cable. In use, the guides may be lubricated with a light oil or gel to facilitate travel of the bushing on the cable.

The bushing 110 is further provided with a cutter body guide surface 118 on an axial end of the bushing. The cutter body guide surface 188 abuts a corresponding guide surface 119 on the cutter body 104 to position and align the cutter body as it is drawn along the cable 50. The guide surfaces 118, 119 may be flat surfaces or may be mating conical or toroidal surfaces.

Most commercially available fiber optic cable 50 includes a metallic strength member underlying the poly sheath. In a preferred embodiment of the invention, the sheath removal apparatus 100 is provided with at least one electrical continuity circuit for determining whether the blades 150, 160 have cut through the sheath and are in contact with the metallic strength member.

In the embodiment shown in FIG. 1, two continuity circuits are shown, one for each blade. Each circuit includes a battery 156, 166 for providing power to the circuit. The battery may be a standard 9 volt battery. One terminal of the battery is connected to a terminal of an indicator light 157, 167 such as a green LED for showing a technician that a continuous circuit has been completed. The other terminal of the indicator light is wired to a connecting lug 158, 168. The other terminal of the batteries 156, 166 is electrically connected to the blades 150, 160, preferably through the adjustment/retention assemblies 155, 165.

To use the continuity circuits, a small window 55 is cut in the sheath of the cable 50 to expose the underlying metallic strength member (the "sub-sheath") at an edge of the proposed sheath removal zone. A wire 160 is connected from the metallic sheath in the window 55 to the lugs 158, 168 of the continuity circuits. The indicator light is illuminated when the blades 150, 160 are extended sufficiently through the sheath to be set against the underlying metallic strength member. The continuity circuits may be used separately, first connecting the first blade 150 to the metallic strength member and extending that blade through the sheath, then connecting the second blade 160 and extending that blade through the sheath. Alternatively, both blades may be connected simultaneously and advanced together.

Figure 2:
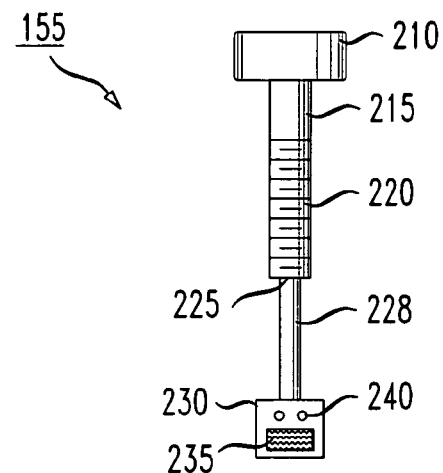
FIG. 2 is a side view of an adjusting screw and blade restrainer according to one embodiment of the invention.
Figure 3:
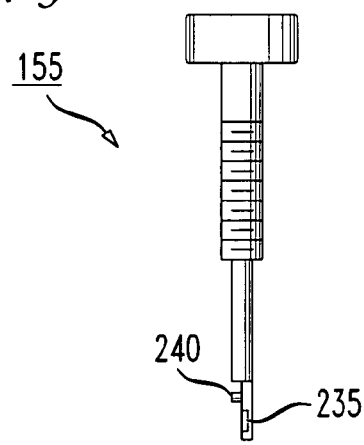
FIG. 3 is a another side view of an adjusting screw and blade restrainer according to one embodiment of the invention.

An adjustment/retention assembly 155 according to one embodiment of the invention is shown in FIGS. 2 and 3. The assembly includes a depth adjustment screw 215 having a knurled knob 210 for grasping and turning by the operator. The adjustment screw 215 has a threaded portion 220 for engagement with the mating female threads in the body. Rotation of the knob 210 causes the assembly 155 to advance in the body.

The adjustment/retention assembly 155 also includes a blade retainer 230 and shaft 228. Those components preferably comprise a single element. The shaft 228 and adjustment screw 215 interface at a swivel point 225, whereby the screw is permitted to turn while the shaft does not rotate. The adjustment screw 215 urges the blade retainer 230 and shaft 228 forward as the adjustment screw is advanced. The swivel point 225 may also have attachment means (not shown) for pulling the adjustment/retention assembly 155 out of the body 104 for blade replacement.

The blade retainer 230 includes a magnetic plate 235 embedded in the retainer. The magnetic plate holds a blade in place as the blade retainer is inserted into the body 104 (FIG. 1). Blade retainer posts 240 are also provided on the blade retainer for precisely establishing a location of the blade and for providing fixed elements to back up the blade as it is advanced into the sheath.

Figure 4:
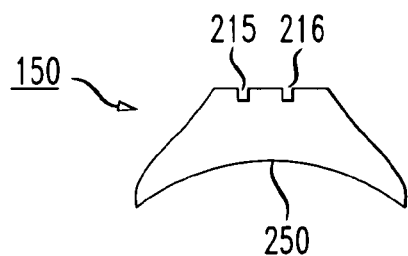
FIG. 4 is a plan view of a cutting blade according to one embodiment of the invention.

A cutting blade 150 according to the invention is shown in FIG. 4. The blade includes slots 215, 216 for accepting the posts 240. The posts and slots align the blade on the retainer 230. The blade also includes a U-shaped razor cutting edge 250 for cutting the sheath. The cutting edge is shaped to conform to the shape of the sheath. In a preferred embodiment in which the cutting angle 185 is about 45 degrees, the cutting edge 250 has a shape tracing a 45 degree ellipse.

A blade may be replaced using the adjustment/retention assembly 155 by first backing out the adjustment screw and removing the blade retainer 230 from the body 104. The blade will be drawn out of the body together with the blade retainer by the magnet 235. The old blade is replaced with a new blade, which is retained by the magnet as it is inserted with the retainer into the body. The blade restrainer posts 240 assure that the new blade is aligned in the body.

Figure 5:
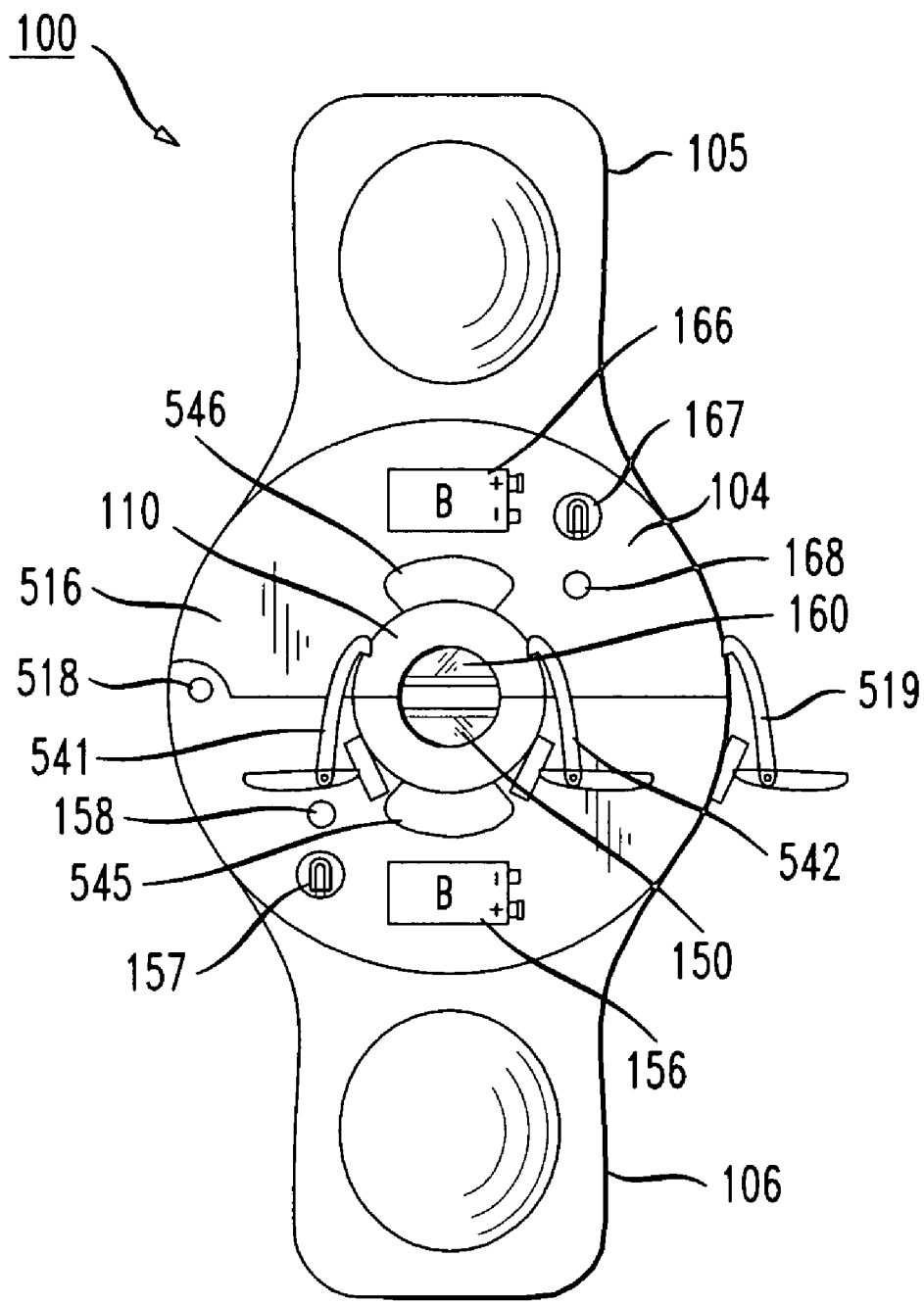
FIG. 5 is a front elevation view of an apparatus for removing a cable sheath according to one embodiment of the invention.

The apparatus 100 of FIG. 1 is shown in front view in FIG. 5 to illustrate the two-piece construction of the body 104. Similar elements are shown using similar element numbers.

In a preferred embodiment, the body 104 comprises a first body half 516 and a second body half 517 that fit around the fiber cable and may be locked around it. The assembly is hinged at hinge 518 to allow the two halves 516, 517 to be opened and the fiber cable to be placed inside the central hole 108 (FIG. 1) of the apparatus. A locking clasp 519 is provided on a side of the body 104 opposite the hinge 518 for maintaining the body halves in a closed position around the cable.

Similarly, the cable stabilizer bushing 110 is split into first and second halves for assembly over the cable and removal from the cable. The bushing may have two locking clasps 541, 542 as shown. Alternatively, the bushing may be hinged in a manner similar to that shown for the body 104.

Exit ports 545, 546 are provided in the body 104 proximate the cutting blades 150, 160 to provide an exit path for sheath shavings as they are cut from the cable. The exit ports are shaped to provide an unobstructed path with smooth transitions for the shavings.

Figure 6:
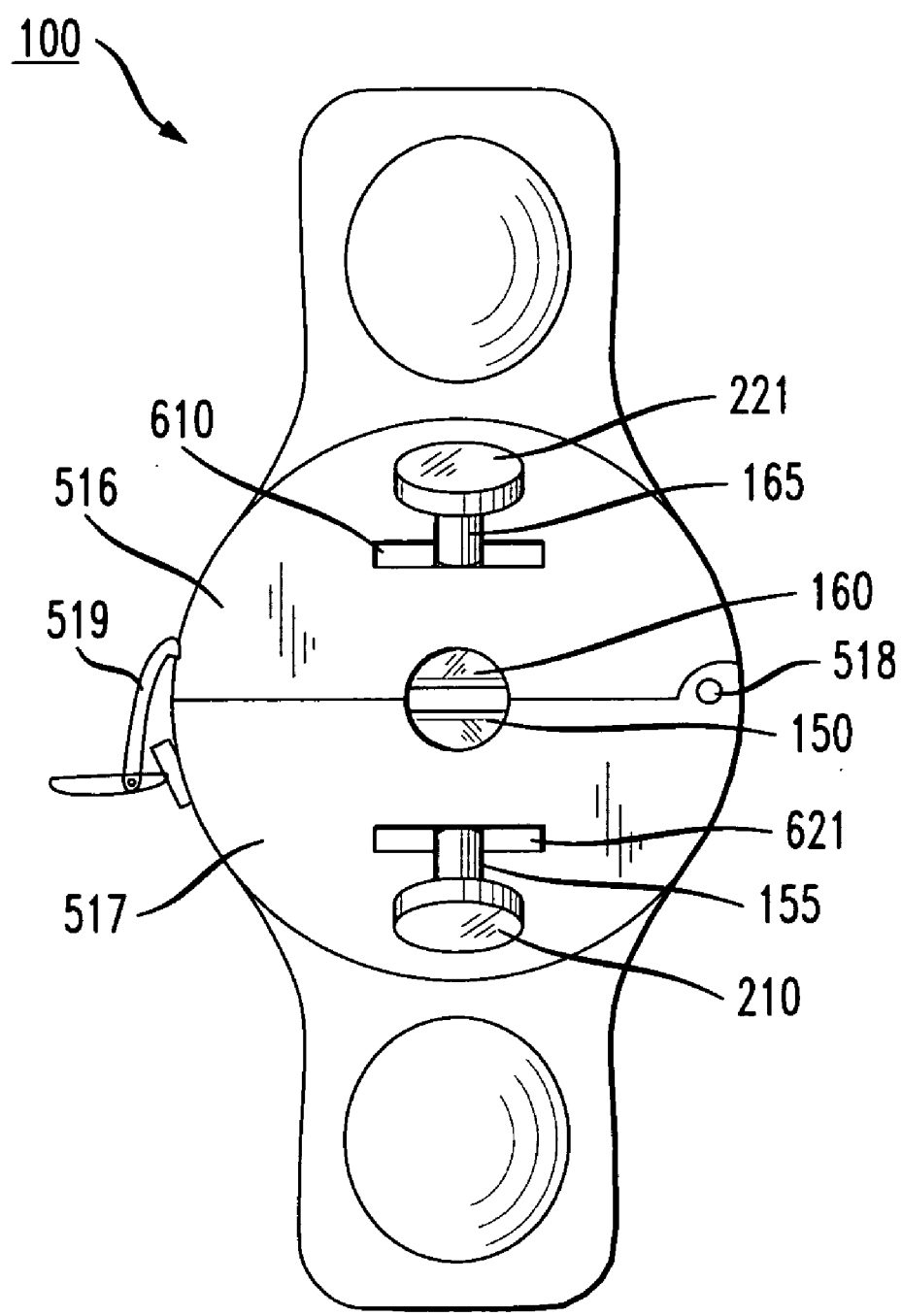
FIG. 6 is a rear elevation view of an apparatus for removing cable sheath according to one embodiment of the invention.

The blade adjustment/retention assemblies 155, 165 are shown protruding from the body 104 in a rear view of the apparatus shown in FIG. 6. The adjustment knobs 210, 211 are accessible at the rear of the cutter body 104 for adjustment by the technician. The adjustment/retention assemblies 155, 165 enter the body 104 through slots 610, 621 to allow assembly of the blades and blade retainers from the rear of the body.

The apparatus of the invention is used in a preferred application to remove the polyethylene sheath from around the fiber cable 50 during restoration and planned cable intrusions. In those applications, the sheath must frequently be removed at points distant from the ends of the cable; i.e., "mid-sheath." To use the apparatus 100, a proposed sheath removal zone is first selected. A small window 55 (FIG. 1) of the polyethylene is removed from the underlying metallic strength member at the edge of the proposed removal zone, and a continuity wire 160 is attached.

The cutter body 104 is then opened and the two halves 516, 517 are assembled over the cable near the window 55 and clamped using the locking clasp 519. Similarly, the two halves of the cable stabilizer bushing 110 are assembled over the cable and clamped together using clasps 541, 542, compressing the elastomeric guides 114, 115. The cutting body 104 is then moved along the cable to contact the stabilizer 110 so that the stabilizing surfaces 118, 119 are aligned.

The continuity wire 160 is then connected to the first continuity circuit lug 158. The depth adjustment knob 210 is turned, advancing the first blade 150 into the poly sheath. When the blade 150 has passed through the sheath and has contacted the underlying metallic strength member, the continuity circuit is closed and indicator light 157 is illuminated by the battery 156. The technician then stops advancing the blade 150, and may back it out slightly.

The continuity wire is then connected to the second lug 168 and the process is repeated for the second blade 160, again advancing it through the poly sheath into contact with the underlying metallic strength member.

After the blades are set against the fiber cable and are penetrating the sheath, the device is pulled in the direction that the blade cutting edges 250 face along the cable. The polyethylene sheath is stripped away from the fiber cable, and the shavings exit through the debris exit ports 545, 546. Once the poly has been removed, the metallic part of the fiber cable may be cut away using hand tools. That allows access to the fibers housed in the fiber cable for restoration, splicing, etc.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to fiber optic cable, the method and apparatus of the invention may be used with any cable containing delicate conveyances and having a plastic or other soft sheath. Further, while the cutter body described herein has two opposing blades, any number of opposing blades, together with associated adjustment/retention assemblies, may be installed in the body. It is to be understood that the embodiments shown and described herein are only illustrative of the principles of the present invention and that various modifications may be implemented by those skilled in the art without departing from the scope and spirit of the invention.

What is claimed is:

1. An apparatus for removing a sheath on an optical fiber cable, the apparatus comprising:
   a body having a central hole, the body being split for positioning around the cable;
   first and second opposed cutting blades having cutting edges protruding from the body into the central hole, said cutting edges facing the cable, said blades being positioned at a cutting angle to a transverse plane of the cable;

first and second adjusting screws rotatably mounted in said body for urging said first and second cutting blades toward said cable;

first and second continuity test circuits for testing electrical continuity between a metallic sub-sheath of the cable and corresponding ones of the first and second cutting blades; and a cable stabilizer bushing for contacting and aligning said body, said bushing having a central hole for accepting the cable, said bushing further having a plurality of elastomeric rollers extending into the hole for rolling on the cable, said bushing being split for positioning around the cable.

2. The apparatus of claim 1, wherein the cutting edges of the cutting blades are elliptical.

3. The apparatus of claim 1, further comprising a locking clasp for locking said body on the cable.

4. The apparatus of claim 1, wherein the cable stabilizer bushing further comprises first and second locking clasps for locking said bushing on the cable.

5. The apparatus of claim 1, further comprising a jumper wire for connecting the continuity circuits to the metallic sub-sheath of the cable.

6. The apparatus of claim 1, wherein the continuity circuits each comprise a battery, an indicator light and a continuity lug for connecting a jumper wire.

7. The apparatus of claim 6, wherein the indicator light is a green LED.

8. The apparatus of claim 1, further comprising first and second blade retainers slideably mounted in the body and contacting corresponding adjusting screws; said blade retainers having blade stops for backing up said cutting blades.

9. The apparatus of claim 8, wherein said first and second blade retainers further comprise magnets proximate said blades for retaining said blades during removal and insertion of the blades to the body.

10. A method for removing a sheath at a mid-sheath point on an optical fiber cable, the method comprising the steps of:

clamping a cutter body around the cable;

turning a first adjustment screw to advance a first cutting blade into the sheath until a first continuity circuit indicates that there is electrical continuity between the first cutting blade and a metallic sub-sheath of the cable;

turning a second adjustment screw to advance a second cutting blade opposing the first cutting blade into the sheath until a second continuity circuit indicates that there is electrical continuity between the second cutting blade and the metallic sub-sheath;

advancing the cutter body in a longitudinal direction along the cable whereby the first and second cutting blades remove portions of the sheath;

clamping a cable stabilization bushing around the cable; and maintaining alignment of the cutter body by contacting the body with the cable stabilization bushing.

11. The method of claim 10, further comprising the steps of:

assembling the first and second cutting blades on magnetized blade supports; and inserting the blade supports into the body.

12. An apparatus for removing a sheath on a cable, the apparatus comprising:

a body having a central hole;

a plurality of opposed cutting blades having cutting edges protruding from the body into the central hole, said cutting edges facing the cable, said blades being positioned at cutting angles to a transverse plane of the cable;

a plurality of adjusting screws rotatably mounted in said body for urging corresponding ones of said cutting blades toward said cable;

at least one continuity test circuit for testing electrical continuity between a metallic sub-sheath of the cable and the cutting blades; and further comprising a cable stabilizer bushing for contacting and aligning said body, said bushing having a central hole for accepting the cable.

13. The apparatus of claim 12, wherein said bushing further comprises a plurality of elastomeric rollers extending into the hole for rolling on the cable.

14. The apparatus of claim 12, wherein said bushing is split for positioning around the cable.

15. The apparatus of claim 12, further comprising a jumper wire for connecting the at least one continuity circuit to the metallic sub-sheath of the cable.

16. The apparatus of claim 12, wherein the at least one continuity circuit comprises a battery, an indicator light and a continuity lug for connecting a jumper wire.

17. The apparatus of claim 12, further comprising a locking clasp for locking said body on the cable.

18. The apparatus of claim 12, wherein the cutting angles are each about 45 degrees.

19. The apparatus of claim 12, wherein the cutting edges of the cutting blades have a curved shape.

* * * * *